United States

Nakagawa 4,113,358

Sep. 12, 1978

[54] RETROFOCUS TYPE WIDE-ANGLE PHOTOGRAPHIC LENS SYSTEM

[75] Inventor: Jihei Nakagawa, Higashimurayama, Japan

[73] Assignee: Olympus Optical Co., Ltd., Tokyo, Japan

[21] Appl. No.: 629,606

[22] Filed: Nov. 6, 1975

[30] Foreign Application Priority Data

Nov. 9, 1974 [JP] Japan ................. 49-128557

[51] Int. Cl.² ............................................. G02B 11/30
[52] U.S. Cl. ................................................. 350/216
[58] Field of Search ..................................... 350/216

[56] References Cited

U.S. PATENT DOCUMENTS

| 3,731,989 | 5/1973 | Shimizu | 350/216 |
| 3,936,153 | 2/1976 | Ogwa | 350/216 |

FOREIGN PATENT DOCUMENTS 931,063 7/1963 United Kingdom ............... 350/216

*Primary Examiner*—Conrad J. Clark
*Attorney, Agent, or Firm*—Cushman, Darby & Cushman

[57] ABSTRACT

A compact retrofocus type wide-angle photographic lens system wherein aberrations are favorably corrected and which comprises a first lens component having negative power, a second lens component having positive power, a third negative lens component, a fourth positive meniscus lens component and a fifth positive lens component, said wide-angle photographic lens system being so adapted as to meet the following conditions.

$$f < f_B < 1.2f \tag{1}$$

$$0.5f < \Sigma d < 0.57f \tag{2}$$

$$0.55f < f_{4,5} < 0.65f \tag{3}$$

$$|r_a| < 1.5f \tag{4}$$

3 Claims, 12 Drawing Figures

SPHERICAL ABERRATION
SINE CONDITION

ASTIGMATISM

DISTORTION

SPHERICAL ABERRATION
SINE CONDITION

ASTIGMATISM

DISTORTION

SPHERICAL ABERRATION
SINE CONDITION

1:2.8

-0.01  0  0.01

ASTIGMATISM

32°

-0.01  0  0.01

DISTORTION

32°

-5%  0  5%

RETROFOCUS TYPE WIDE-ANGLE PHOTOGRAPHIC LENS SYSTEM

BACKGROUND OF THE INVENTION (a) Field of the Invention

The present invention relates to a retrofocus type large aperture wide-angle photographic lens system.

(b) Description of the Prior Art

In the field of lens systems for photographic cameras, performance of retrofocus type lens systems have been remarkably improved in recent days mainly by increasing the number of lens component. However, increase in the number of lens components can not always assure enhancement in performance of lens systems but makes it impossible to design compact lens systems. Such a measure for improvement of lens systems is therefore very disadvantageous in manufacturing photographic lens systems.

SUMMARY OF THE INVENTION

A general object of the present invention is to provide a very compact retrofocus type wide-angle large aperture lens system comprising a small number of lens components wherein aberrations are corrected favourably.

The photograhic lens system according to the present invention comprises only five lens components wherein the first component is a meniscus lens component having negative power, the second component is a lens component having positive power, the third component is a negative lens, the fourth component is a positive meniscus lens and the fifth component is a positive lens. The lens systems according to the present invention satisfies the following conditions:

$$f < f_B < 1.2f \quad (1)$$

$$0.5f < \Sigma d < 0.57f \quad (2)$$

$$0.55f < f_{4,5} < 0.65f \quad (3)$$

$$|r_a| > 1.5f \quad (4)$$

wherein the reference symbols represent as defined below:

$f$: total focal length of the entire lens system $f_B$: back focal length $f_{4,5}$: total focal length of the fourth and fifth lens components considered as a whole $\Sigma d$: distance as measured from the front side of the second lens component to the rear side of the third lens component $r_a$: radius of curvature of the rear surface of the second lens component When $f_B$ exceeds the upper limit of condition (1) ($f_B > 1.2f$) in the lens system described above, $f$ has a small value and the field angle becomes large since $f_B$ has a nearly constant value in lens systems adapted for use with a single-lens reflex cameras. It is therefore impossible to favourably correct aberrations in a lens system comprising a small number of lens components and having a large aperture like the lens system according to the present invention. The condition of $f_B < 1.2f$ is required for this reason. If $f_B$ has a value smaller than the lower limit of condition (1) ($f > f_B$), on the other hand, $f_B$ has a small value and it becomes impossible to design a retrofocus type wide-angle lens system adapted for use with a single-lens reflex camera.

In the second place, condition (2) is necessary for eliminating curvature of field and astigmatism since it is impossible to sufficiently correct these aberrations when $\Sigma d$ is smaller than $0.5f$. If $\Sigma d$ has too small a value, it is impossible to select a small diameter for the front lens since a large airspace is required between the first and second lens components. The entire lens system becomes unavoidably large when $\Sigma d$ has a value smaller than the lower limit of condition (2). When $\Sigma d$ has a value larger than $0.57f$, on the other hand, the above-mentioned aberrations will be overcorrected and it is made impossible to properly correct the aberrations in the entire lens system.

Condition (3) is effective for favourably correcting spherical aberration and coma. When $f_{4,5}$ is smaller than $0.55f$, spherical aberration is aggravated. When $f_{4,5}$ is larger than $0.65f$, on the other hand, coma is overcorrected especially for upper rays and, further, the rear lens group with positive power has a longer focal distance as a whole, thereby shifting forward the conjugate position corresponding to the plane of the image formed by the rear lens group. The total length of the entire lens system is therefore prolonged and it becomes impossible to accomplish the object of the present invention to provide a compact lens system.

Condition (4), which can exhibit sufficient effect in combination with the other conditions, is required for favourably correcting coma. When this condition is not met, coma can not be favourably corrected for lower rays. Speaking more concretely, coma is overcorrected when $r_a$ has a positive value and undercorrected when it has a negative value.

DETAILED DESCRIPTION OF THE PREFERRED EMBODIMENTS

Now, some numerical data of the lens system according to the present invention will be exemplified below:

| Embodiment 1 | | |
|---|---|---|
| $r_1 = 0.89501$ | | |
| $d_1 = 0.19296$ | $n_1 = 1.72$ | $\nu_1 = 42.1$ |
| $r_2 = 12.63956$ | | |
| $d_2 = 0.05513$ | $n_2 = 1.51633$ | $\nu_2 = 64.2$ |
| $r_3 = 0.38615$ | | |
| $d_3 = 0.40384$ | | |
| $r_4 = 1.17183$ | | |
| $d_4 = 0.15409$ | $n_3 = 1.8061$ | $\nu_3 = 40.9$ |
| $r_5 = -0.55000$ | | |
| $d_5 = 0.05513$ | $n_4 = 1.69895$ | $\nu_4 = 30.1$ |
| $r_6 = 17.11794$ | | |
| $d_6 = 0.09648$ | | |
| $r_7 = -0.81932$ | | |
| $d_7 = 0.23073$ | $n_5 = 1.80518$ | $\nu_5 = 25.4$ |

-continued

Embodiment 1

$r_8 = 2.53199$
$d_8 = 0.03584$
$r_9 = -3.16141$
$d_9 = 0.12818$    $n_6 = 1.757$    $\nu_6 = 47.9$
$r_{10} = -0.59818$
$d_{10} = 0.00276$
$r_{11} = 1.77635$
$d_{11} = 0.08270$    $n_7 = 1.757$    $\nu_7 = 47.9$
$r_{12} = -5.55394$
$f = 1.0$, $f_B = 1.06413$, F/2.0
$f_{4,5} = 0.621$, $\Sigma d = 0.53643$

Embodiment 2

$r_1 = 0.92105$
$d_1 = 0.19288$    $n_1 = 1.72342$    $\nu_1 = 38.0$
$r_2 = 5.22870$
$d_2 = 0.05511$    $n_2 = 1.51633$    $\nu_2 = 64.2$
$r_3 = 0.37584$
$d_3 = 0.41551$
$r_4 = 1.25533$
$d_4 = 0.15816$    $n_3 = 1.8061$    $\nu_3 = 40.9$
$r_5 = -0.46704$
$d_5 = 0.05511$    $n_4 = 1.69895$    $\nu_4 = 30.1$
$r_6 = -20.22105$
$d_6 = 0.12399$
$r_7 = -0.83307$
$d_7 = 0.19233$    $n_5 = 1.80518$    $\nu_5 = 25.4$
$r_8 = 2.48493$
$d_8 = 0.04602$
$r_9 = -2.94809$
$d_9 = 0.09258$    $n_6 = 1.757$    $\nu_6 = 47.9$
$r_{10} = -0.59996$
$d_{10} = 0.00276$
$r_{11} = 2.14910$
$d_{11} = 0.08266$    $n_7 = 1.762$    $\nu_7 = 40.2$
$r_{12} = -3.42802$
$f = 1.0$, $f_B = 1.08251$, F/2.0
$f_{4,5} = 0.629$, $\Sigma d = 0.52959$

Embodiment 3

Figure 1:
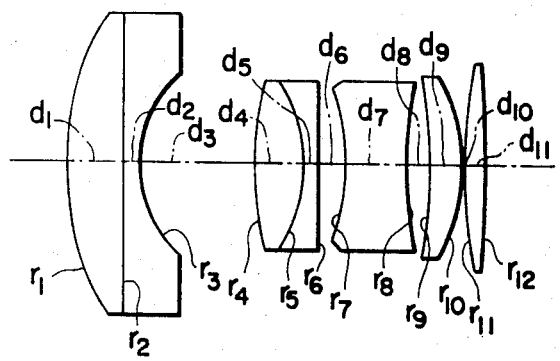
FIG. 1 is a sectional view illustrating the composition of a preferred embodiment of the present invention.
Figure 2A:
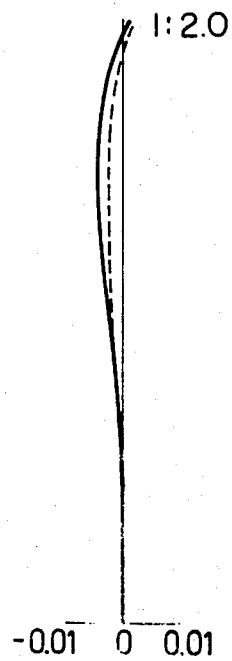
FIG. 2A through FIG. 2C illustrate curves showing the aberration characteristic of the embodiment 1.
Figure 2B:
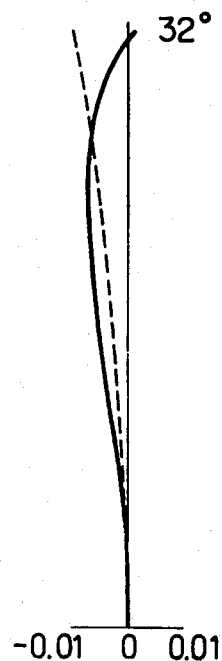
Figure 2C:
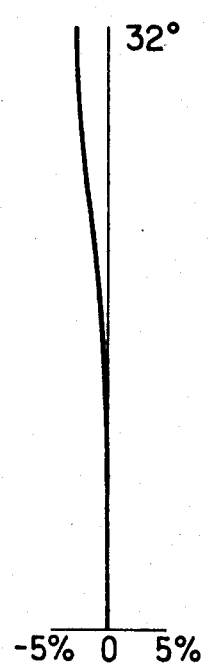
Figure 3:
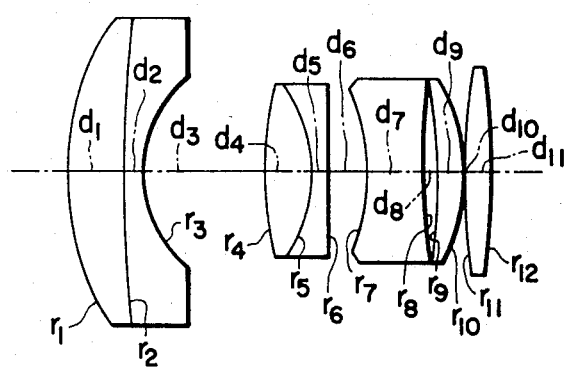
FIG. 3 shows a sectional view illustrating the composition of another embodiment of the present invention.
Figure 4A:
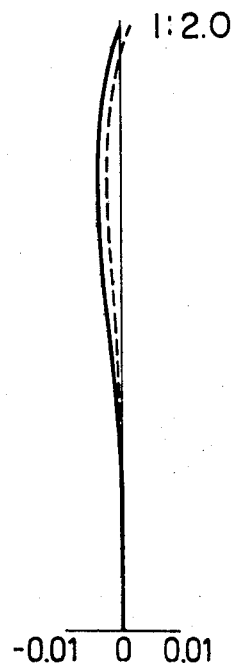
FIG. 4A through FIG. 4C show graphs illustrating the aberration characteristic of the embodiment 2.
Figure 4B:
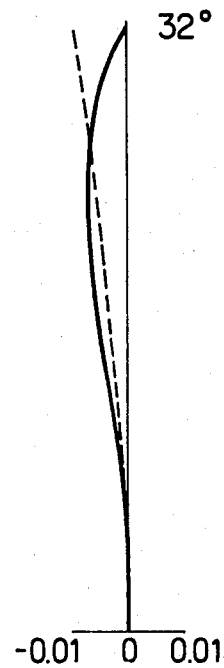
Figure 4C:
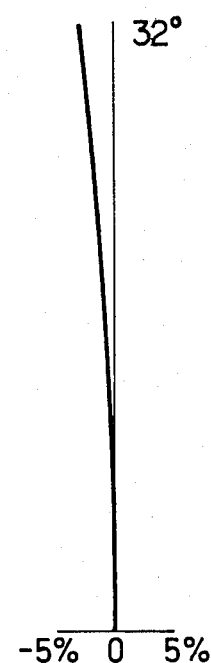
Figure 5:
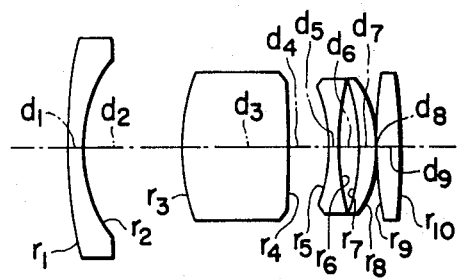
FIG. 5 illustrates a sectional view showing the composition of a third embodiment of the present invention.
Figure 6A:
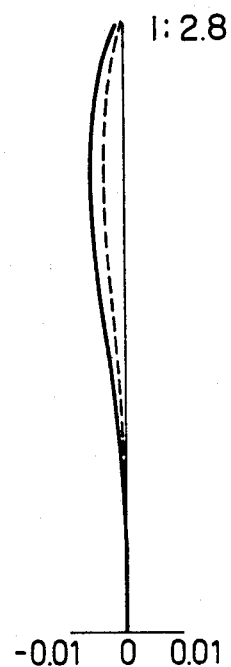
FIG. 6A through 6C show graphs illustrating the aberration characteristic of the embodiment 3.
Figure 6B:
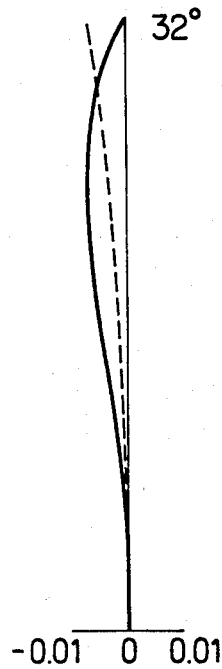
Figure 6C:
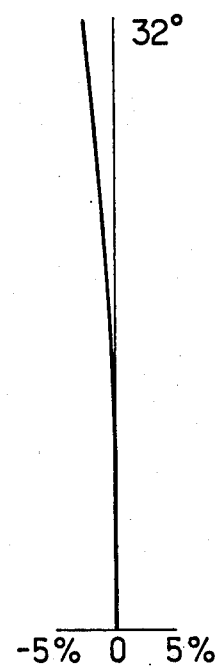

$r_1 = 1.52399$
$d_1 = 0.04666$    $n_1 = 1.51633$    $\nu_1 = 64.2$
$r_2 = 0.44075$
$d_2 = 0.33470$
$r_3 = 0.65227$
$d_3 = 0.36655$    $n_2 = 1.72$    $\nu_2 = 50.3$
$r_4 = -1.64457$
$d_4 = 0.12852$
$r_5 = -0.54644$
$d_5 = 0.04414$    $n_3 = 1.74077$    $\nu_3 = 27.8$
$r_6 = 1.36494$
$d_6 = 0.03911$
$r_7 = -0.89578$
$d_7 = 0.06817$    $n_4 = 1.757$    $\nu_4 = 47.9$
$r_8 = -0.42798$
$d_8 = 0.00279$
$r_9 = 1.66768$
$d_9 = 0.06733$    $n_5 = 1.713$    $\nu_5 = 53.9$
$r_{10} = -2.76854$
$f = 1.0$, $f_B = 1.08095$, F/2.8
$f_{4,5} = 0.598$, $\Sigma d = 0.53921$ Of the embodiments described above, the embodiment 1 is illustrated in FIG. 1 in which reference symbol $\Sigma d$ represents $d_4 + d_5 + d_6 + d_7$ and reference symbol $r_a$ denotes $r_6$. Similarly in the embodiment 2 which is illustrated in FIG. 3, reference symbol $\Sigma d$ represents $d_4 + d_5 + d_6 + d_7$ and reference symbol $r_a$ denotes $r_6$. In the embodiment 3 which is illustrated in FIG. 5, wherein the first and second lens components are composed of a single lens element respectively unlike the two embodiments mentioned above, reference symbol $\Sigma d$ represents $d_3 + d_4 + d_5$ and reference symbol $r_a$ denotes $r_4$.

I claim:

1. A retrofocus type wide-angle photographic lens system comprising a first negative cemented doublet lens component, a second positive cemented doublet lens component, a third negative lens component, a fourth positive meniscus lens component and a fifth positive lens component, and said wide-angle photographic lens system having the following numerical data:

$r_1 = 0.89501$
$d_1 = 0.19296$    $n_1 = 1.72$    $\nu_1 = 42.1$
$r_2 = 12.63956$
$d_2 = 0.05513$    $n_2 = 1.51633$    $\nu_2 = 64.2$
$r_3 = 0.38615$
$d_3 = 0.40384$
$r_4 = 1.17183$
$d_4 = 0.15409$    $n_3 = 1.8061$    $\nu_3 = 40.9$
$r_5 = 0.55000$
$d_5 = 0.05513$    $n_4 = 1.69895$    $\nu_4 = 30.1$
$r_6 = 17.11794$
$d_6 = 0.09648$
$r_7 = -0.81932$
$d_7 = 0.23073$    $n_5 = 1.80518$    $\nu_5 = 25.4$
$r_8 = 2.53199$
$d_8 = 0.03584$
$r_9 = -3.16141$
$d_9 = 0.12818$    $n_6 = 1.757$    $\nu_6 = 47.9$
$r_{10} = -0.59818$
$d_{10} = 0.00276$
$r_{11} = 1.77635$
$d_{11} = 0.08270$    $n_7 = 1.757$    $\nu_7 = 47.9$
$r_{12} = -5.55394$
$f = 1.0$, $f_B = 1.06413$, F/2.0
$f_{4,5} = 0.621$, $\Sigma d = 0.53643$ 2. A retrofocus type wide-angle photographic lens system comprising a first negative cemented doublet lens component, a second positive cemented doublet lens component, a third negative lens component, a fourth positive meniscus lens component and a fifth positive lens component, and said wide-angle photographic lens system having the following numerical data:

$r_1 = 0.92105$
$d_1 = 0.19288$    $n_1 = 1.72342$    $\nu_1 = 38.0$
$r_2 = 5.22870$
$d_2 = 0.05511$    $n_2 = 1.51633$    $\nu_2 = 64.2$
$r_3 = 0.37584$
$d_3 = 0.41551$
$r_4 = 1.25533$
$d_4 = 0.15816$    $n_3 = 1.8061$    $\nu_3 = 40.9$
$r_5 = -0.46704$
$d_5 = 0.05511$    $n_4 = 1.69895$    $\nu_4 = 30.1$
$r_6 = -20.22105$
$d_6 = 0.12399$
$r_7 = -0.83307$
$d_7 = 0.19233$    $n_5 = 1.80518$    $\nu_5 = 25.4$
$r_8 = 2.48493$
$d_8 = 0.04602$
$r_9 = -2.94809$
$d_9 = 0.09258$    $n_6 = 1.757$    $\nu_6 = 47.9$
$r_{10} = -0.59996$
$d_{10} = 0.00276$
$r_{11} = 2.14910$
$d_{11} = 0.08266$    $n_7 = 1.762$    $\nu_7 = 40.2$
$r_{12} = -3.42802$
$f = 1.0$, $f_B = 1.08251$, F/2.0
$f_{4,5} = 0.629$, $\Sigma d = 0.52959$ 3. A retrofocus type wide-angle photographic lens system comprising a first negative meniscus lens component, a second positive lens component, a third negative lens component, a fourth positive meniscus lens component and fifth positive lens component, and said wide-angle photograhic lens system having the following numerical data:

$r_1 = 1.52399$
$d_1 = 0.04666$    $n_1 = 1.51633$    $\nu_1 = 64.2$
$r_2 = 0.44075$
$d_2 = 0.33470$
$r_3 = 0.65227$

-continued

| | | |
|---|---|---|
| $d_3 = 0.36655$ | $n_2 = 1.72$ | $\nu_2 = 50.3$ |
| $r_4 = -1.64457$ | | |
| $d_4 = 0.12852$ | | |
| $r_5 = -0.54644$ | | |
| $d_5 = 0.04414$ | $n_3 = 1.74077$ | $\nu_3 = 27.8$ |
| $r_6 = 1.36494$ | | |
| $d_6 = 0.03911$ | | |
| $r_7 = -0.89578$ | | |

-continued

| | | |
|---|---|---|
| $d_7 = 0.06817$ | $n_4 = 1.757$ | $\nu_4 = 47.9$ |
| $r_8 = -0.42798$ | | |
| $d_8 = 0.00279$ | | |
| $r_9 = 1.66768$ | | |
| $d_9 = 0.06733$ | $n_5 = 1.713$ | $\nu_5 = 53.9$ |
| $r_{10} = -2.76854$ | | |
| $f = 1.0$, | $f_B = 1.08095$, | F/2.8 |
| $f_{4,5} = 0.598$, | $\Sigma d = 0.53921$ | |

* * * * *